(12) United States Patent
Cleaver

(10) Patent No.: US 10,064,402 B1
(45) Date of Patent: Sep. 4, 2018

(54) NO DEAD ZONE TRIGGER SYSTEM

(71) Applicant: Gary Cleaver, Colony, KS (US)

(72) Inventor: Gary Cleaver, Colony, KS (US)

( * ) Notice: Subject to any disclaimer, the term of this patent is extended or adjusted under 35 U.S.C. 154(b) by 0 days.

(21) Appl. No.: 15/718,144

(22) Filed: Sep. 28, 2017

(51) Int. Cl.
*A01M 23/26* (2006.01)
*A01M 23/28* (2006.01)

(52) U.S. Cl.
CPC .......... *A01M 23/265* (2013.01); *A01M 23/26* (2013.01); *A01M 23/28* (2013.01)

(58) Field of Classification Search
CPC .... A01M 23/24; A01M 23/245; A01M 23/26; A01M 23/265; A01M 23/28
USPC ...................................................... 43/88–97
See application file for complete search history.

(56) References Cited

U.S. PATENT DOCUMENTS

| | | | | |
|---|---|---|---|---|
| 1,494,918 A * | 5/1924 | Kleinpeter | ............ | A01M 23/30 43/81 |
| 2,489,095 A | 11/1949 | Lienhard | | |
| 2,559,348 A * | 7/1951 | De Hart | ................ | A01M 23/26 43/90 |
| 3,535,816 A * | 10/1970 | Montgomery | ......... | A01B 39/19 43/93 |
| 4,479,324 A * | 10/1984 | Askins | .................. | A01M 23/26 43/92 |
| 4,486,972 A * | 12/1984 | Helfrich | ................ | A01M 23/26 43/88 |
| 4,557,068 A * | 12/1985 | Thomas | ................ | A01M 23/26 43/90 |
| 4,766,693 A | 8/1988 | Splawinski | | |
| 4,972,626 A * | 11/1990 | Medvetz | ................ | A01M 23/26 43/88 |
| 7,421,821 B2 * | 9/2008 | Butera | .................. | A01M 23/26 43/88 |

\* cited by examiner

*Primary Examiner* — David J Parsley
(74) *Attorney, Agent, or Firm* — Dale J. Ream

(57) ABSTRACT

A trigger system includes a jaw latch coupled to an inner surface of a first jaw member of a pair of jaws of a coil-spring trap, the jaw latch defining a ledge. A jaw dog includes a body portion having an elongate linear configuration and opposed proximal and distal ends, the proximal end including a latch flange selectively positioned on the ledge at a set configuration. A pan has a continuous peripheral edge and a cam member extending downwardly from the peripheral edge, the pan defining a planar configuration that is perfectly horizontal at the set configuration. The body portion defines a cam ridge configured to partially receive the cam member at the set configuration. The trigger system is fired when pressure is detected at any point on the pan surface.

10 Claims, 17 Drawing Sheets

The green shaded area is the dead zone of all traps currently available today

NO DEAD ZONE TRIGGER SYSTEM

BACKGROUND OF THE INVENTION

This invention relates generally to steel foothold trap trigger systems and, more particularly, to a steel foothold trap trigger system that has No Dead Zone.

Metal foothold traps have been in use since 1300 A.D. and in all that time, the basics of the trap have changed very little. That's because the foothold trap is one of the most ahead-of-its-time inventions ever developed. Inasmuch as the current invention relates to the basic function of steel foothold traps, a brief functional description of conventional traps is in order.

The pan of a conventional foothold trap is pivotally anchored to the trap frame. The pan is what the animal steps on to trigger the trap, or what is commonly referred to as to "fire" the trap. The dog of the trap is pivotally anchored outside of the trap jaw circumference on a part of the trap's frame commonly referred to as the dog post.

When the trap's springs are manually compressed and the jaws are opened up to form an elongated circle, rectangle, etc., the dog is used to capture one of the jaws. This is accomplished by the dog pivoting over the top of one jaw and set into a notch on the pan; this in turn holds the trap jaws open under substantial pressure from the springs.

Therefore, when a specific amount of weight is applied to the pan by the target animal, the pan is compressed in a downward motion and pivots at its pivot point. By this process, the pan drops under the animal's weight and pulls away from the dog that is anchored firmly at its own pivot point and the captured jaw is released.

Thus, when the pan and the dog are pulled apart or "disengaged", the dog is forced upwardly in a pivoting arch by the pressure of the jaws which are being forced up by the compressed springs and the trap is closed on the animal's foot.

There have been numerous modifications to steel foothold traps over the years, including several different trigger systems designs. However, steel traps, from their earliest beginnings to the modern foothold traps of today, all have a design flaw. They all have a "dead zone."

On all modern foothold traps available today, there is a part of the trigger system that will not fire the trap when an animal steps on it. This is commonly referred to as the dead zone of the trap. The dead zone of a trap is the part of the trigger system that includes the pan at the vertical point of its pivot location and the dog.

This dead zone, on average, can be as much as one third of the inside diameter of the trap (as is shown in the drawings illustrating the prior art discussed below). Thus, a target animal can step inside the jaws of the trap and not be captured. Theoretically, the trap could miss one third of the animals that step inside the jaws.

Therefore, it would be desirable to have a steel foothold trap trigger system that is one hundred percent free of any dead zone. Furthermore, it would be desirable to have a steel foothold trap trigger system that incorporates a camming device capable of producing even pan tension on all parts of the trap pan.

SUMMARY OF THE INVENTION

A No Dead Zone trigger system for steel foot-hold traps according to the present invention, includes a pan which is pivotally anchored to the trap frame by a brace having an H-shaped configuration (referred to herein as the "H brace").

The H brace pivotally attaches to the cam side of the pan by means of two matching distal ends. The H brace crosses beneath the pan and is pivotally anchored to the trap frame by the two opposing ends of the H brace. The H brace is designed to stabilize the pan with the use of four matched pivoting anchor points. This disallows any twisting or sideways movement of the pan while allowing a very stable pan that can freely scissor up and down.

The No Dead Zone trigger system also incorporates a jaw dog, which is pivotally anchored to the trap frame by the spring pin of the trap. This anchoring site is below and in-line with a jaw latch assembly that connects the jaw dog to a jaw of a trap. This allows for vertical in-line pressure applied at the jaw latch. Whereas, the pivot point of the jaw dog is well balanced and minimal jaw dog movement is required to disengage the jaw latch and fire the trap.

The distal end of the jaw dog is slotted and crosses under the pan. It is pivotally anchored in the center and on the opposite side of the pan in relation to the H brace pivot points. The slot in the distal end of the jaw dog allows necessary lateral movement to achieve the scissoring action of the trigger system which keeps the pan level at all times and also allows the jaw latch to engage and disengage.

Furthermore, the jaw dog incorporates a cam ridge that perfectly aligns with the cam on the bottom of the pan. This camming action is necessary to help equalize pan tension on both sides of the pan. (Pan tension refers to the amount of downward pressure required to fire the trap).

Without this camming action, the pan tension would be unequal on opposing sides of the pan. The distal end of the jaw dog and the side of the pan that it connects to, takes less pressure to disengage the jaw latch. By placing the cam on the opposite side of the pan, (where it requires more pressure to disengage the jaw latch), the camming action accelerates the jaw dog movement and helps to equalize the pan tension. In other words, when pressure is applied to the pan at the distal end of the jaw dog, then it is the distal end of the jaw dog that disengages the jaw latch. Conversely, if pressure is applied to the opposite side of the pan (where the pan cam is located) then it is the action of the pan cam that disengages the jaw latch.

The final component of the No Dead Zone trigger system is the jaw latch. The jaw latch consists of two separate, precisely cut angles on both the top half of the latch and the bottom half of the latch. The top half of the latch is located on the proximal end of the jaw dog and the bottom half of the latch is located on a slight ledge on the inner surface of the trap jaw.

The above information concerning pan tension is directed towards obtaining even pan tension on all parts of the pan itself. The actual pan tension of the trap is determined by the angle and depth of the two halves of the jaw latch. The pan tension on the current prototype is an optimal three pounds.

Therefore, a general object of this invention is to provide a No Dead Zone trigger system that is one hundred percent free of any dead zone.

Another object of this invention is to provide a no dead zone trigger system, as aforesaid, that incorporates a camming assembly capable of producing even pan tension on all parts of the trap pan.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 4b is a sectional view taken along line 4b-4b of FIG. 4a;

DESCRIPTION OF THE PREFERRED EMBODIMENT

Figure 1:
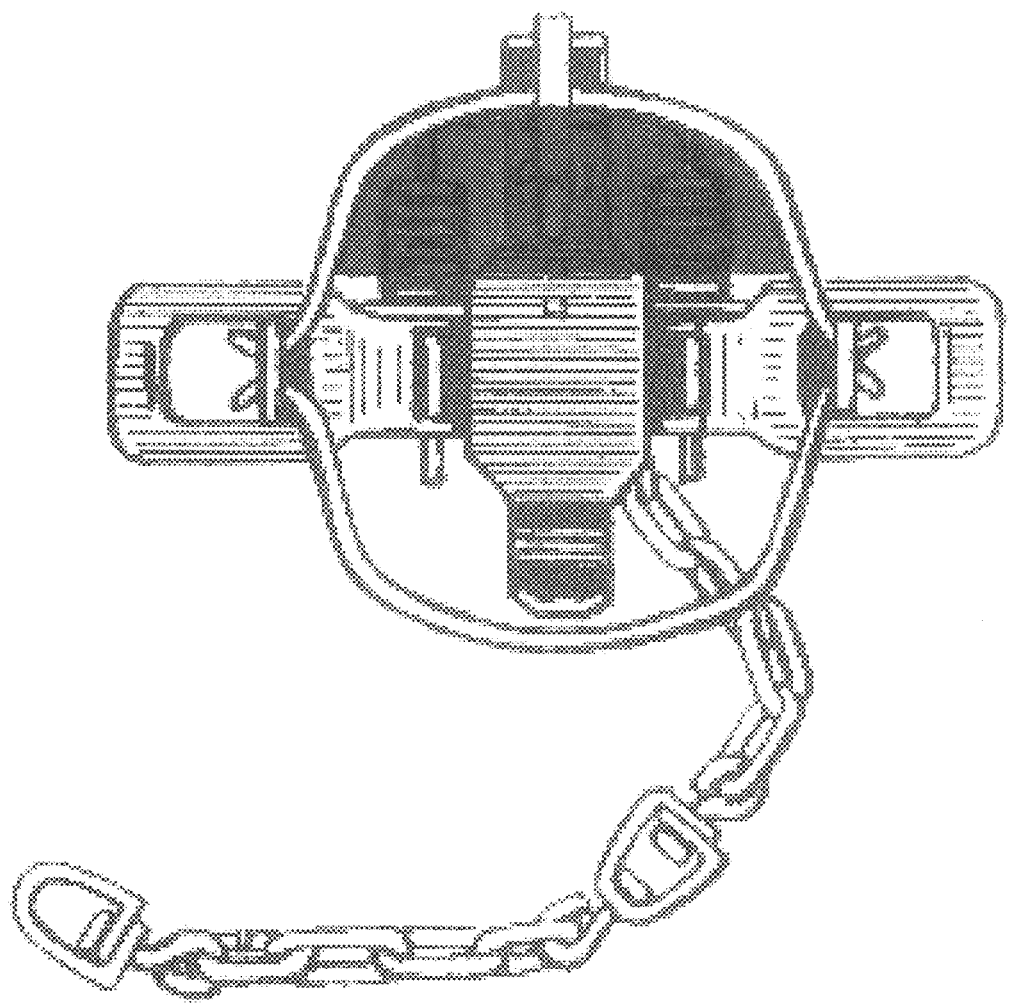
FIG. 1 is a top view of a steel foothold trap common in the prior art illustrating in green the portion of the trap known as a "dead zone."

The no dead zone trigger system with no dead zones will now be described in detail with reference to FIGS. 1 to 17 of the accompanying drawings. The trigger system 10 includes a jaw latch 30, a jaw dog 34 having a latch flange 38 and a body portion 36 defining a cam ridge 37 and a pan 40 having a cam member 46.

Figure 2:
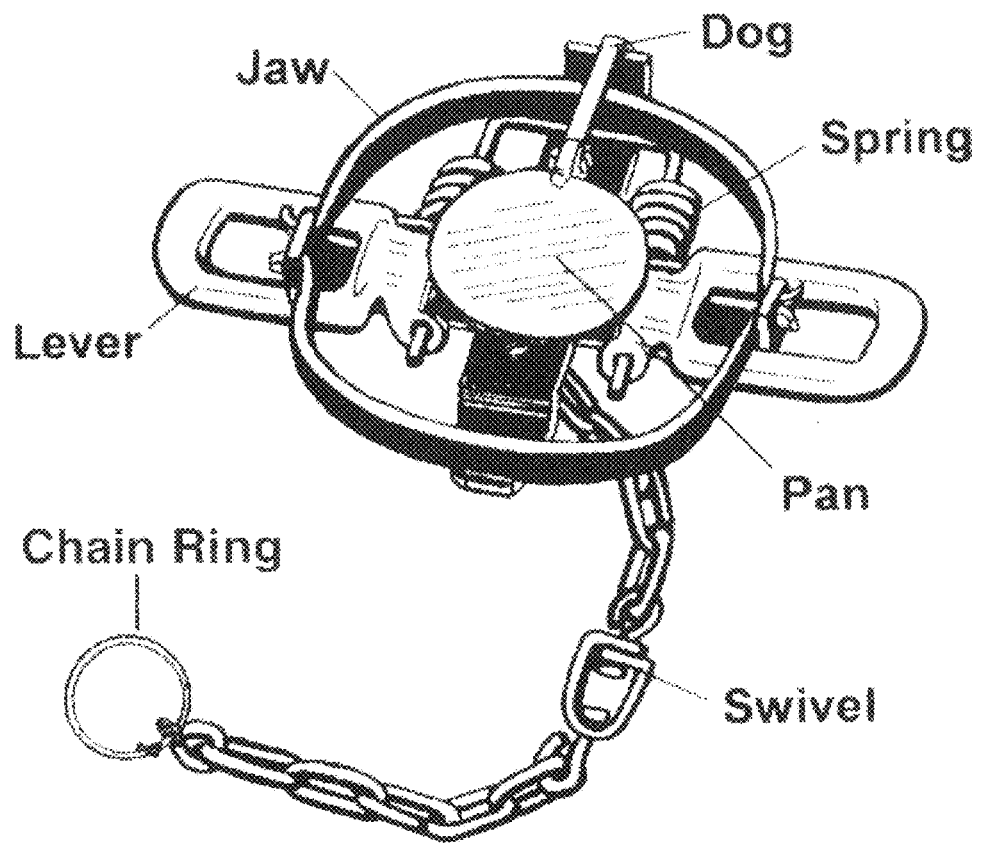
FIG. 2 is a perspective view of a steel foothold trap common in the prior art.
Figure 3:
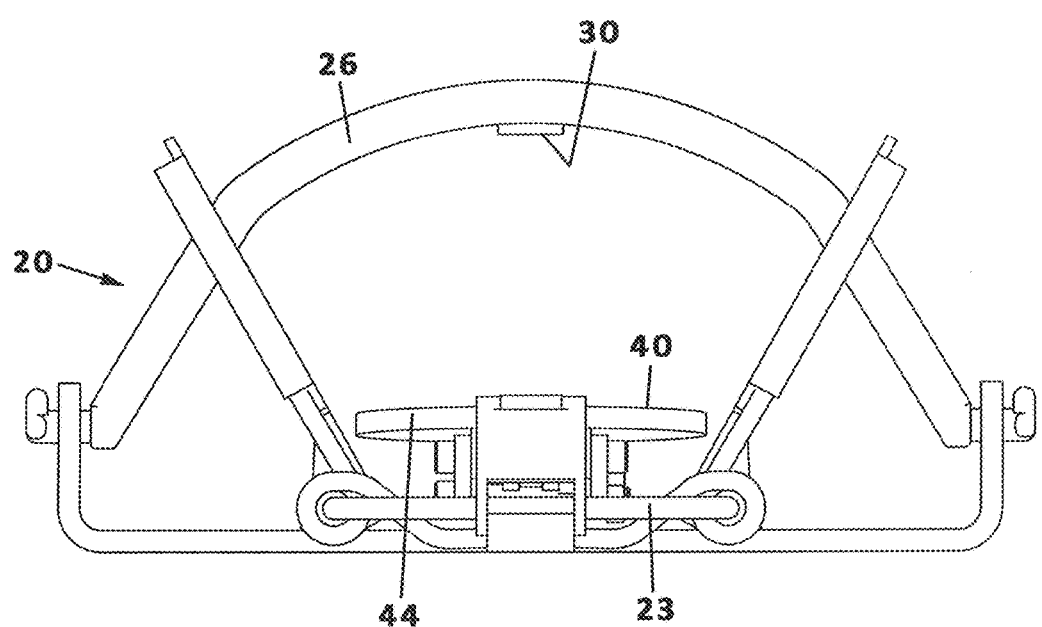
FIG. 3 is a front view of a no dead zone trigger system according to the present invention illustrated in use with a steel foothold trap illustrated in a fired configuration.
Figure 4A:
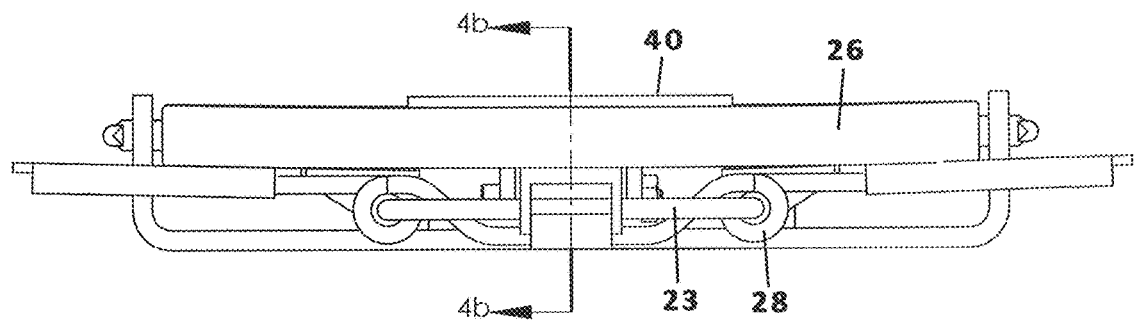
FIG. 4a is a side view of the no dead zone trigger system as in FIG. 3, illustrated in a set configuration.
Figure 4B:
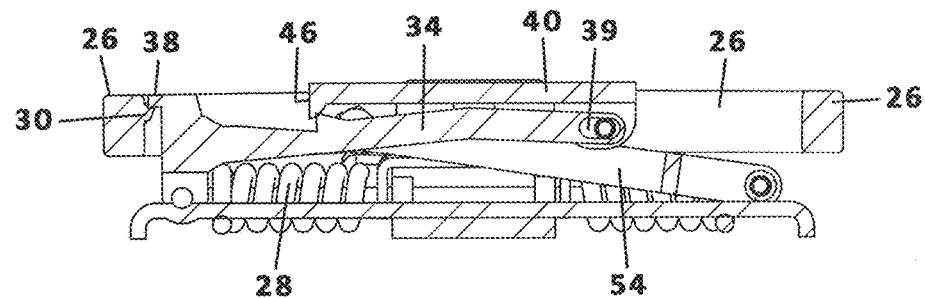
Figure 5:
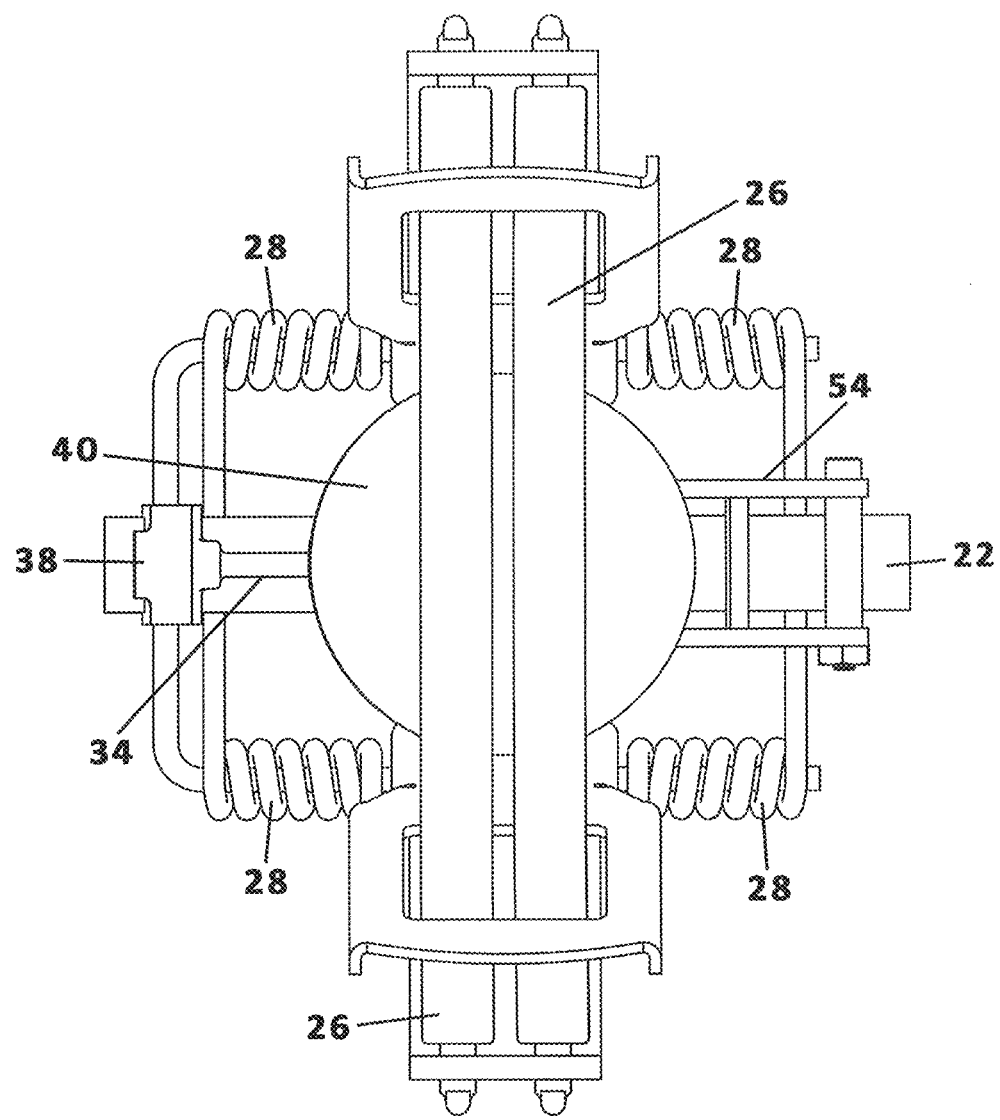
FIG. 5 is a top view of the no dead zone trigger system as in FIG. 3, illustrated in a fired configuration.

FIG. 1 illustrates a steel foothold trap that is exemplary of prior art devices. The conventional steel foothold trap is disadvantageous in that as much as one third of the trigger system will not fire the trap when an animal steps on it. In FIG. 1, the darkened area in the upper one-third of the trap represents this dead zone. FIG. 2 is an illustration of a steel foothold trap used in the prior art. The following description of the present invention provides a solution to the disadvantages of the prior art, i.e. eliminates the "dead zone."

FIGS. 3 to 17 illustrate the no dead zone trigger system according to the present invention in use with a steel foothold trap and operation of the trap between set and fired configurations. The construction of the jaws 26, base member 22, and coil springs 28 of the trap 20 will not be described in significant detail as such is known in the art. Otherwise, elements of the trap 20 will be identified and described as needed to give context and understanding to the no dead zone trigger system 10 of the present invention.

A No Dead Zone trigger system 10 for use with a steel foot-hold trap 20 according to the present invention, includes a pan 40 which is pivotally anchored to the base member 22 of the trap frame by a brace 54 to be described later.

The pan 40 has a thin, planar configuration and is supported by a pan framework that positions and supports the pan 40 in an even tensioned horizontal configuration. In an exemplary embodiment, the pan 40 may define a peripheral edge 44 and include flanges 42 for attachment to an H brace 54 and jaw dog 34 as will be described below in more detail. A cam member 46 is coupled to the peripheral edge 44 of the pan 40 and extends downwardly therefrom and perpendicular to the planar surface of the pan 40.

Figure 10:
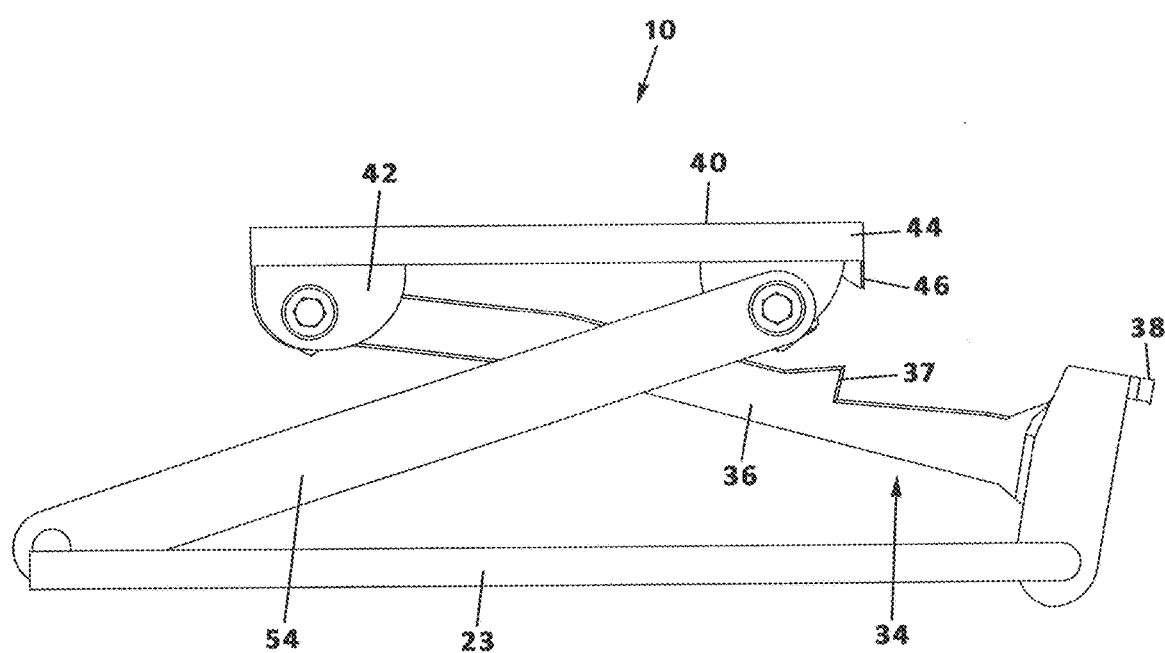
FIG. 10 is an isolated view on an enlarged scale taken from FIG. 9 illustrating the scissor movement of the H brace and jaw dog that supports the pan.
Figure 15:
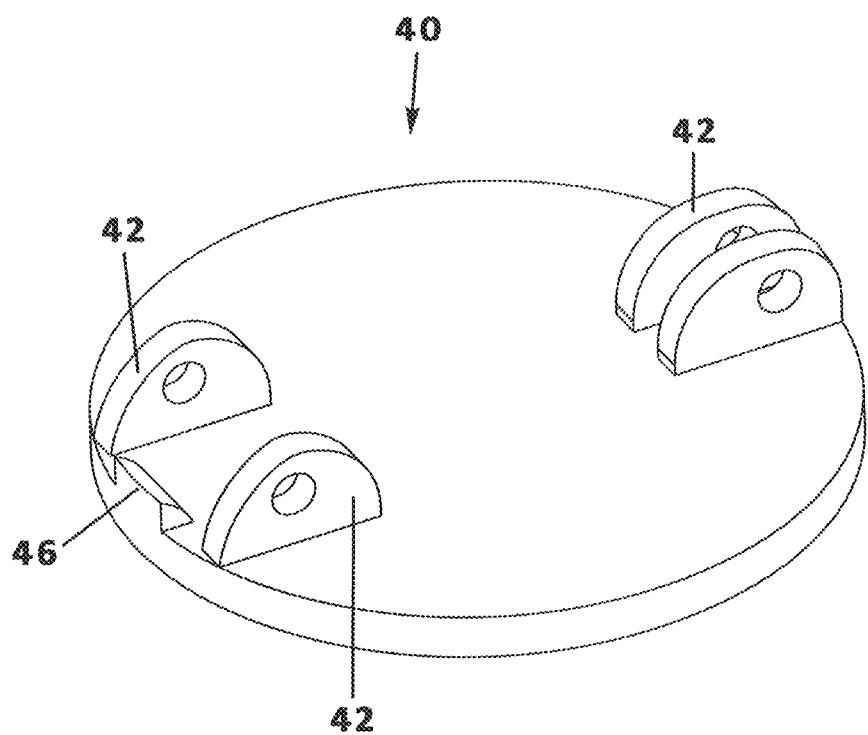
FIG. 15 is an isolated view on an enlarged scale of the underside of the pan.
Figure 16:
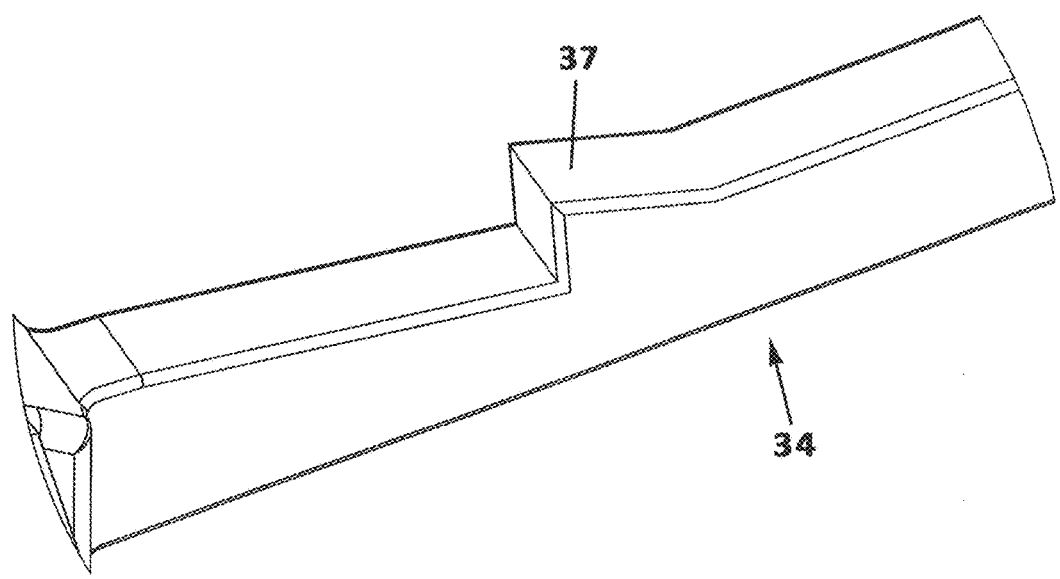
FIG. 16 is an isolated view on an enlarged scale of the cam ridge defined by the body portion of the jaw dog.
Figure 17:
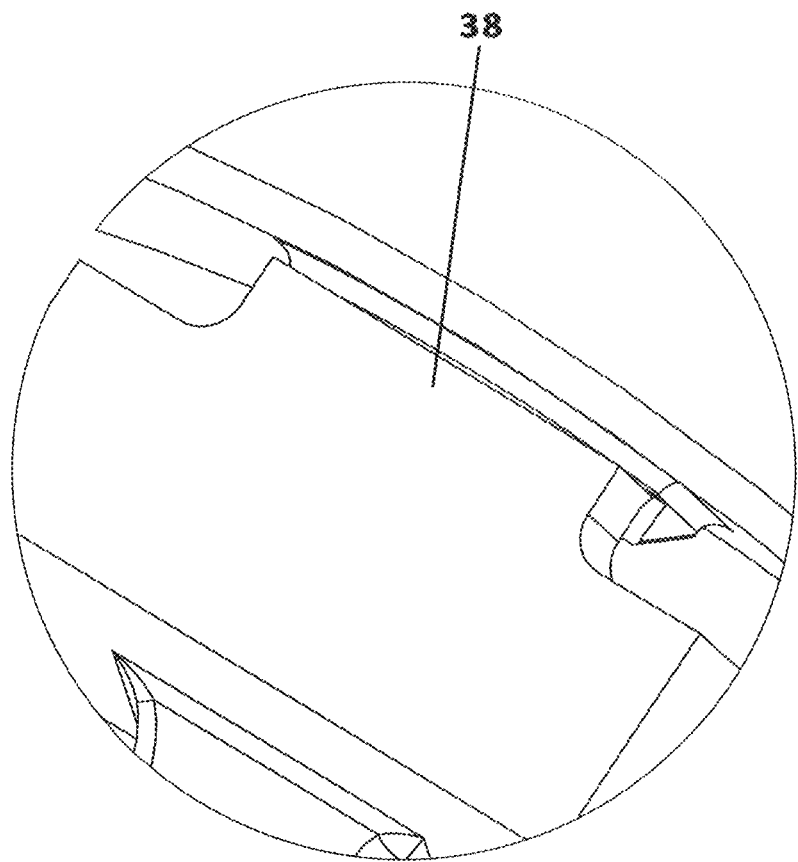
FIG. 17 is an isolated view on an enlarged scale of the jaw latch assembly engaged.

The brace 54 may have an H-shaped configuration (referred to herein as the "H brace" or "pan bracket"). The H brace 54 includes two spaced apart matching distal ends pivotally coupled to spaced apart flanges situated on an underside of the pan 40 adjacent the cam side thereof (also referred to as a "cam-side" of the pan and shown in FIG. 16). The H brace 54 crosses beneath the pan 40 and includes spaced apart proximal ends pivotally anchored to the trap frame opposite the cam-side of the pan 40. The H brace 54 is designed to stabilize the pan 40 with the use of four matched pivoting anchor points, namely two spaced apart anchor points at each end (FIG. 15). This configuration prevents any twisting or sideways movement of the pan 40 while allowing a very stable pan that can freely scissor up and down. The scissor action that supports the pan 40 in a horizontal position is shown in FIG. 10.

The no dead zone trigger system 10 also incorporates a jaw dog 34, which is pivotally anchored to the trap frame by the spring pin 23 of the trap. The jaw dog 34 includes a body portion 36 having an elongate and generally linear configuration extending between proximal and distal ends. This anchoring site is below and in-line with a jaw latch that connects the jaw dog 34 to a jaw 26 of the trap 20. This allows for vertical in-line pressure applied at the jaw latch. Whereas, the pivot point of the jaw dog 34 is well balanced and minimal jaw dog movement is required to disengage the jaw latch 34 and fire the trap. The jaw dog 34 includes a latch assembly at a proximal end thereof as will be described in more detail below.

Figure 6:
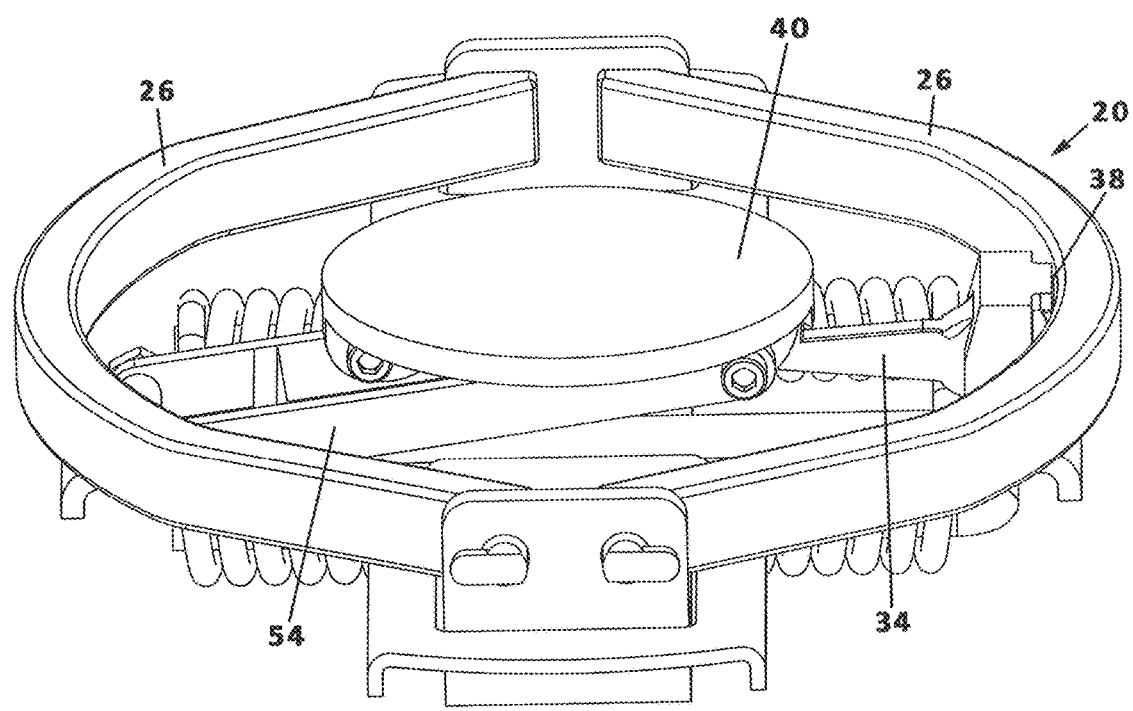
FIG. 6 is an isolated view on an enlarged scale of the trigger system as in FIG. 3, illustrated in a set configuration.
Figure 7:
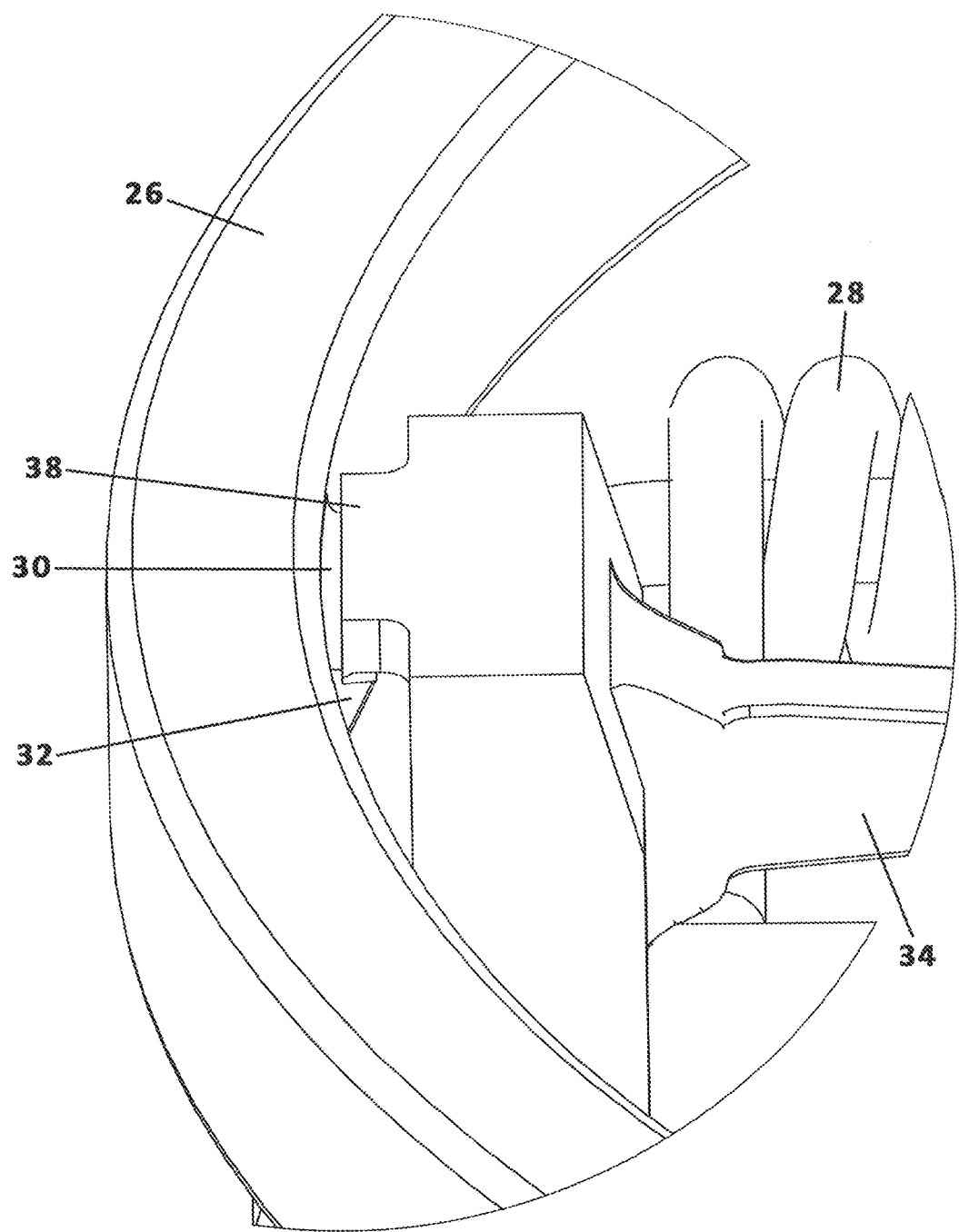
FIG. 7 is an isolated view on an enlarged scale of a latch assembly according to the present invention.
Figure 8:
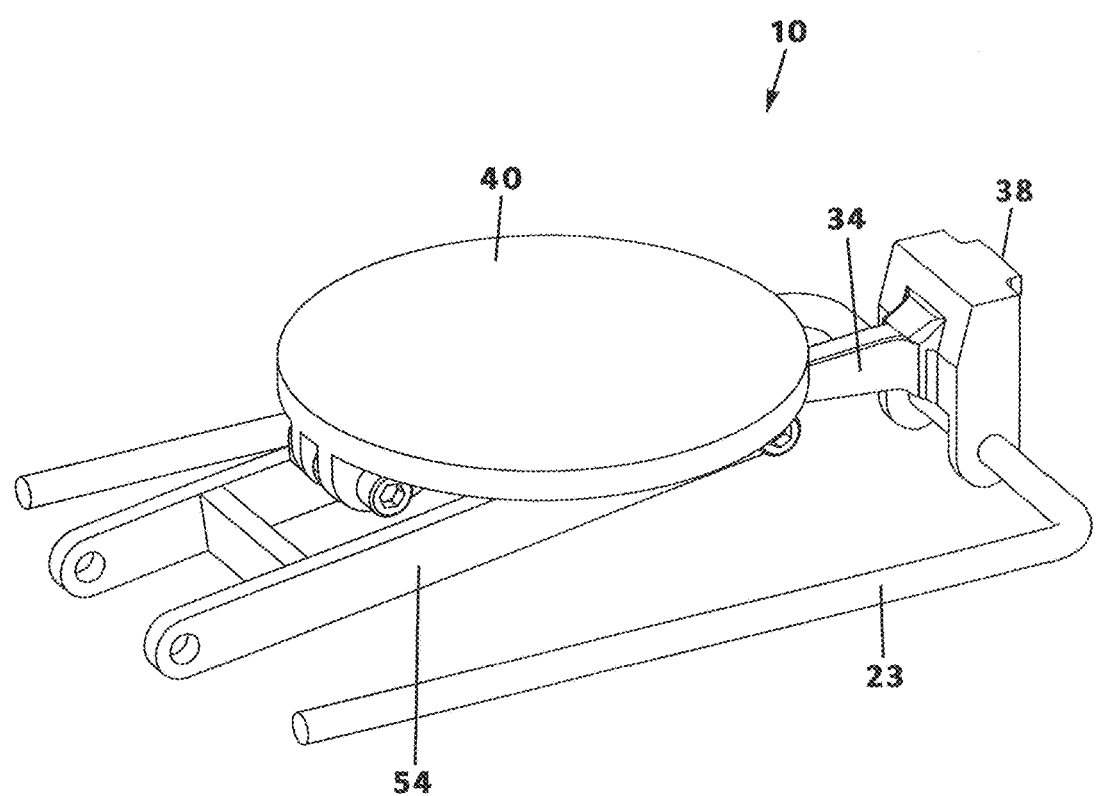
FIG. 8 is an isolated view on an enlarged scale of the pan, H brace, and jaw dog with its anchoring spring pin according to the present invention.
Figure 9:
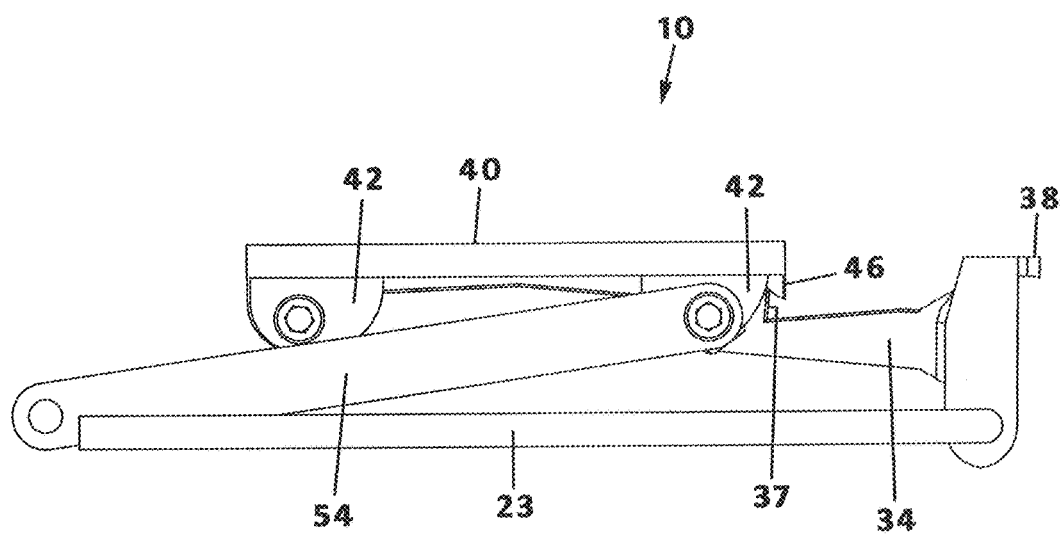
FIG. 9 is a side view of the illustration of FIG. 8.
Figure 11:
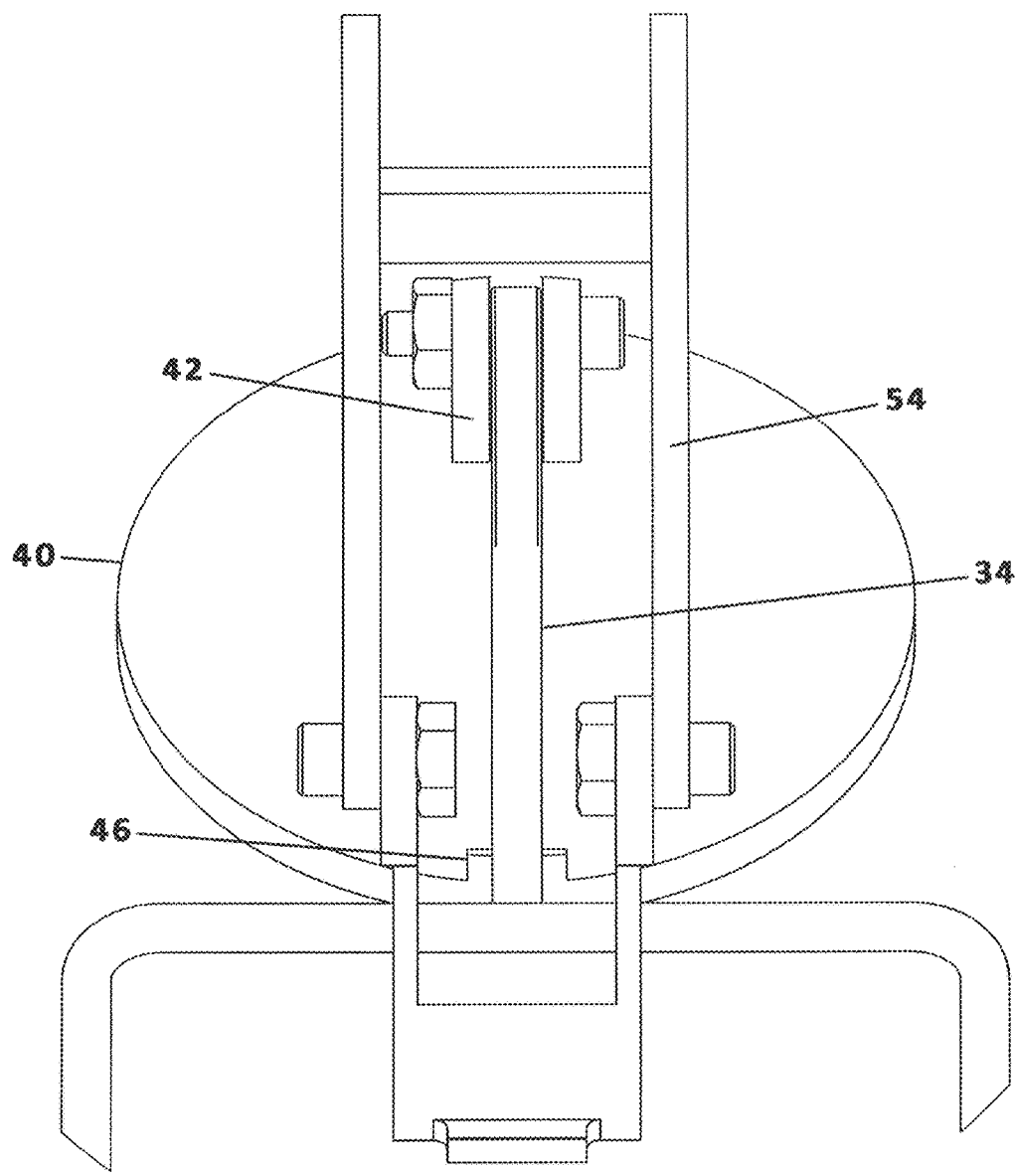
FIG. 11 is a perspective view from a lower angle of the assembly illustrated in FIG. 10.

The distal end of the jaw dog 34 defines a slot 39 (FIGS. 4b and 13) and extends under the pan 40 (FIG. 6). It is pivotally coupled to a respective flange on the opposite side of the pan in relation to the H brace pivotal mounting points. The slot 39 in the distal end of the jaw dog allows necessary lateral movement to achieve the scissoring action of the trigger system which keeps the pan 40 level at all times and also allows the jaw latch to engage and disengage (FIG. 11).

Figure 12A:
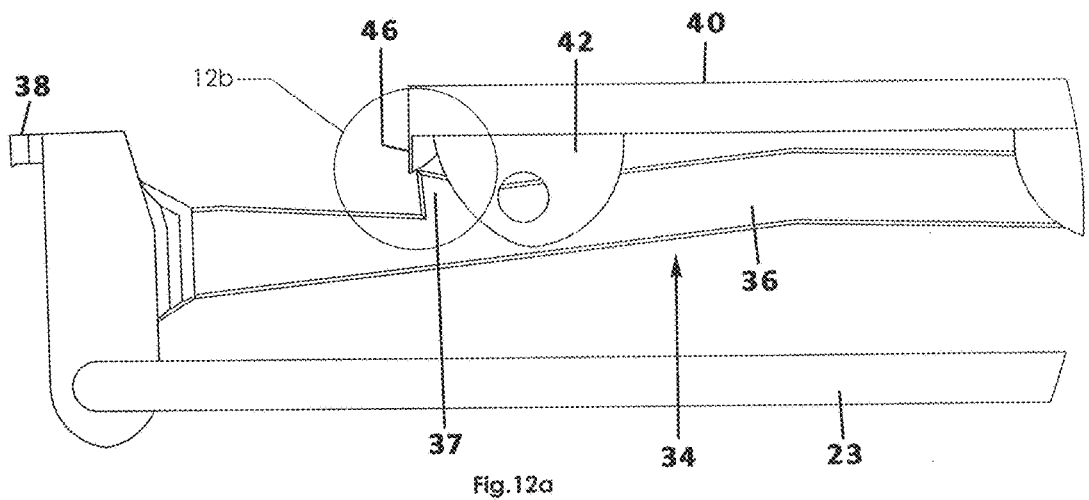
FIG. 12a is an isolated view from a reverse angle of a portion of the assembly illustrated in FIG. 9.
Figure 12B:
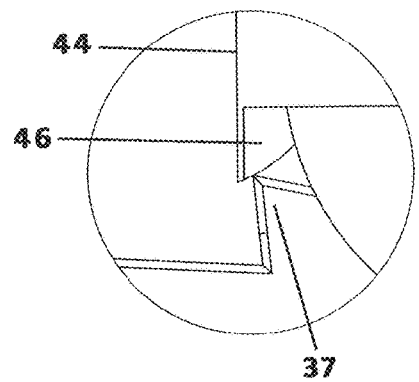
FIG. 12b is an isolated view on an enlarged basis taken from FIG. 12a that shows the cam member and cam ridge in a set configuration.
Figure 13:
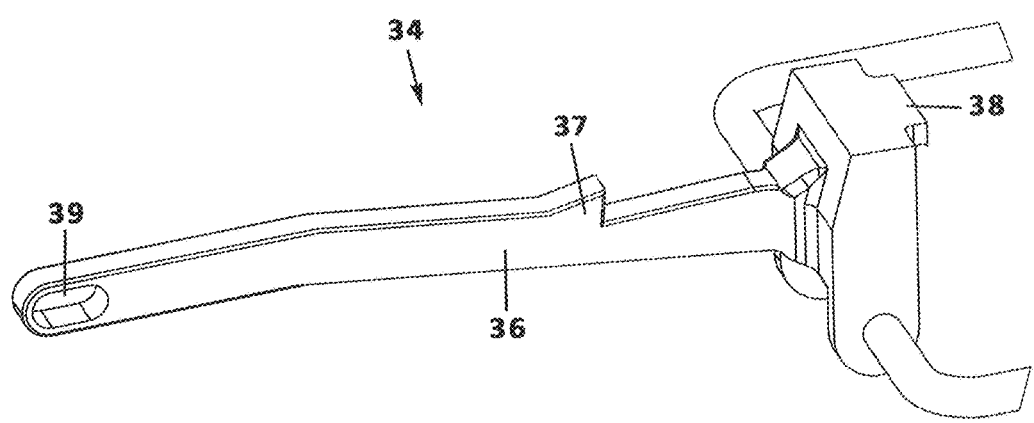
FIG. 13 is an isolated view on an enlarged scale of the jaw dog disconnected from the pan.
Figure 14:
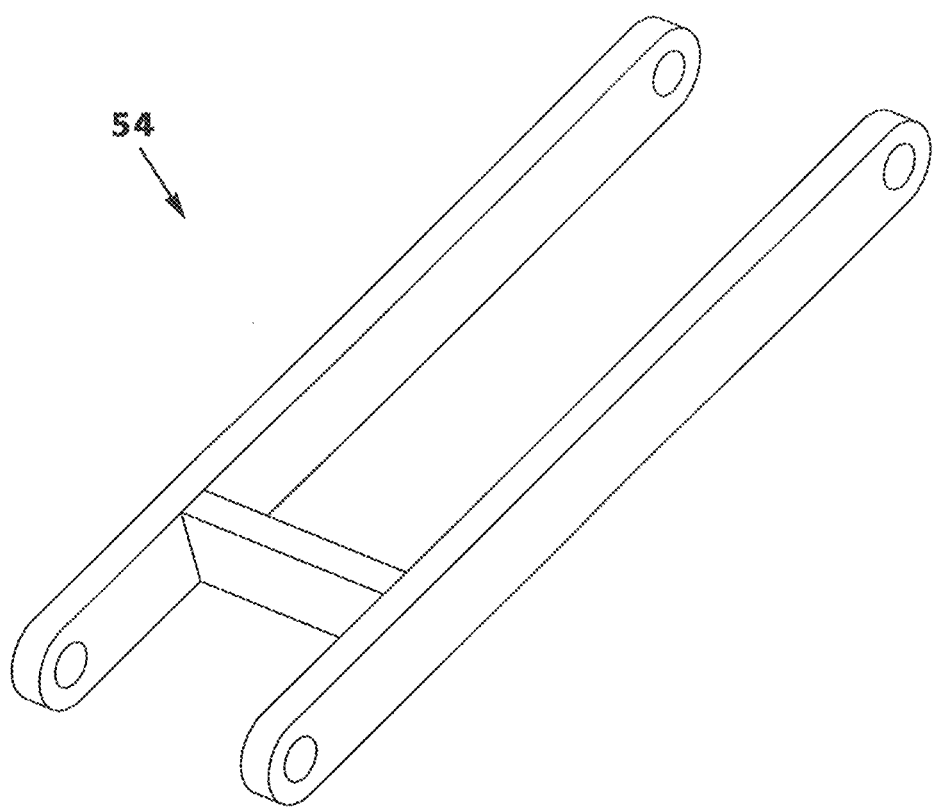
FIG. 14 is an isolated view on an enlarged scale of the H brace removed from attachment to the pan.

Furthermore, the jaw dog 34 defines a cam ridge 37 (FIG. 17) that perfectly aligns with the cam member 46 depending from the bottom of the pan 40 (described above). When set, the cam member 46 is aligned with and partially engages with the cam ridge 37 as shown in FIG. 12. This camming action is critical to help equalize pan tension on both sides of the pan. (Pan tension refers to the amount of downward pressure required to fire the trap).

Without this camming action, the pan tension would be unequal on opposing sides of the pan. The distal end of the jaw dog 34 and the side of the pan that it connects to, takes less pressure to disengage the jaw latch assembly. By placing the cam member 46 on the opposite side of the pan 40, (where it requires more pressure to disengage the jaw latch assembly), the camming action accelerates the jaw dog movement and helps to equalize the pan tension. In other words, when pressure is applied to the pan 40 at the distal end of the jaw dog 34, then it is the distal end of the jaw dog 34 that disengages the jaw latch assembly as described above. Conversely, if pressure is applied to the opposite side of the pan (where the cam member 46 is located) then it is the action of the cam member 46 that disengages the jaw latch assembly.

The above information concerning pan tension is directed towards obtaining even pan tension on all parts of the pan itself. The actual pan tension of the trap is determined by the angle and depth of the two halves of the jaw latch assembly (e.g. jaw latch 30 and latch flange 38). The pan tension on the current prototype is an optimal three pounds.

Now, with further reference to the jaw latch assembly, the jaw latch consists of two separate, precisely cut angles on both the top half of the latch and the bottom half of the latch. The top half of the latch is located on the proximal end of the jaw dog 34 and the bottom half of the latch is located on a slight ledge 32 on the inner surface of a trap jaw 26. The structures of the "top half" and "bottom half" of the jaw latch assembly are described as follows:

A jaw latch 30 is coupled to an inner surface of a first jaw member 26 of the pair of jaws, the jaw latch 30 defining a ledge 32. In an embodiment, the ledge 32 may further define a recess or notch having a predetermined angle. The proximal end of the jaw dog 34 includes a latch flange 38 having a configuration that mates, nests, or is otherwise received by the ledge 32 of the jaw latch 30 in the set configuration. Preferably, the latch flange 38 and ledge 32 have complementary configurations that fit together but which do not restrict movement, such as when being disengaged or dislodged as will be described later.

It is understood that while certain forms of this invention have been illustrated and described, it is not limited thereto except insofar as such limitations are included in the following claims and allowable functional equivalents thereof.

The invention claimed is:

1. A no dead zone trigger system, comprising:
a pan having a planar surface defining a horizontal plane bounded by a continuous peripheral edge and having a cam member extending from said peripheral edge perpendicular to said planar surface;
a framework having an elongate linear configuration;
a brace having a proximal end pivotally coupled to said framework and a distal end pivotally coupled to a bottom surface of said pan;
a jaw latch having an inner wall defining a ledge;
a jaw dog including a body portion having an elongate configuration and opposed proximal and distal ends, said distal end being pivotally coupled to said pan and said proximal end having a latch flange selectively engaged with said jaw latch in a set configuration and selectively disengaged from said jaw latch in a fired configuration;
wherein said brace and said jaw dog are arranged in a scissor arrangement that supports said pan in a horizontal configuration at all times
wherein said body portion of said jaw dog defines a cam ridge having a configuration aligned with said cam member for operably equalizing a tension on said pan;
wherein said brace has a H-shaped configuration having a pair of spaced apart ends pivotally coupled to a side of said pan proximate said cam member and a pair of spaced apart ends pivotally coupled to said framework opposite said side of said pan proximate said cam member, wherein said brace supports said pan at a horizontal configuration having even tension even when said brace is pivoted in the scissor arrangement.

2. The no dead zone trigger system as in claim 1, wherein said distal end of said jaw dog defines a slot pivotally coupled to said pan such that said jaw dog is pivotally and laterally movable with respect to said pan when said brace is pivotally moved in the scissor arrangement.

3. The no dead zone trigger system as in claim 1 wherein:
said cam member is operative to disengage said latch flange from said jaw latch when a predetermined amount of pressure is placed on said planar surface of said pan proximate said cam member; and
said distal end of said jaw dog is operative to disengage said latch flange from said jaw latch when a predetermined amount of pressure is placed on said planar surface of said pan opposite said cam member.

4. The no dead zone trigger system as in claim 1, wherein:
said ledge of said jaw latch has an angled configuration;
said latch flange of said proximal end of said jaw dog includes an angled configuration complementary to the angled configuration of said jaw latch;
said ledge selectively receiving said latch flange in a nested arrangement at said set configuration.

5. The no dead zone trigger system as in claim 4, wherein a quantitative measure of tension associated with said pan is defined by an angle and depth of the angled configurations of said ledge and said latch flange.

6. A no dead zone trigger system, comprising:
a pan having a planar surface defining a horizontal plane bounded by a continuous peripheral edge and having a cam member extending from said peripheral edge perpendicular to said planar surface;
a framework having an elongate linear configuration;
a brace having a proximal end pivotally coupled to said framework and a distal end pivotally coupled to a bottom surface of said pan;
a jaw latch having an inner wall defining a ledge;
a jaw dog including a body portion having an elongate configuration and opposed proximal and distal ends, said distal end being pivotally coupled to said pan and said proximal end having a latch flange selectively engaged with said jaw latch in a set configuration and selectively disengaged from said latch flange in a fired configuration;
wherein said brace and said jaw dog are arranged in a scissor arrangement that supports said pan in a horizontal configuration at all times;
said pan includes a cam member extending from said peripheral edge perpendicular to said planar surface;
wherein said body portion of said jaw dog defines a cam ridge having a configuration aligned with said cam member for operably equalizing a tension on said pan;
wherein said brace has a H-shaped configuration having a pair of spaced apart ends pivotally coupled to said pan proximate said cam member and a pair of spaced apart ends pivotally coupled to said framework opposite said side of said pan proximate said cam member, wherein said brace supports said pan at a horizontal configuration having even tension even when said brace is pivoted in the scissor arrangement.

7. The no dead zone trigger system as in claim 6, wherein said distal end of said jaw dog defines a slot pivotally coupled to said pan such that said jaw dog is pivotally and laterally movable with respect to said pan when said brace is pivotally moved in the scissor arrangement.

8. The no dead zone trigger system as in claim 6, wherein:
said cam member is operative to disengage said latch flange from said jaw latch when a predetermined amount of pressure is placed on said planar surface of said pan proximate said cam member; and
said distal end of said jaw dog is operative to disengage said latch flange from said jaw latch when a predetermined amount of pressure is placed on said planar surface of said pan opposite said cam member.

9. The no dead zone trigger system as in claim 6, wherein:
said ledge of said jaw latch has an angled configuration;
said latch flange of said proximal end of said jaw dog includes an angled configuration complementary to the angled configuration of said jaw latch;
said ledge selectively receiving said latch flange in a nested arrangement at said set configuration.

10. The no dead zone trigger system as in claim 9, wherein a quantitative measure of tension associated with said pan is defined by an angle and depth of the angled configurations of said ledge and said latch flange.

\* \* \* \* \*